(12) United States Patent
Suzuki et al.

(10) Patent No.: US 6,779,953 B2
(45) Date of Patent: Aug. 24, 2004

(54) APPARATUS FOR POSITIONING A CUTTER OF A TOOL RELATIVE TO THE SPINDLE OF A MACHINE TOOL

(75) Inventors: Masaharu Suzuki, Kanagawa-Pref. (JP); Koji Enomoto, Kanagawa-Pref. (JP)

(73) Assignee: Makino J. Co., Ltd., Ailawa-Machi (JP)

( * ) Notice: Subject to any disclaimer, the term of this patent is extended or adjusted under 35 U.S.C. 154(b) by 171 days.

(21) Appl. No.: 10/015,901

(22) Filed: Oct. 26, 2001

(65) Prior Publication Data
US 2002/0114676 A1 Aug. 22, 2002

(30) Foreign Application Priority Data
Oct. 27, 2000 (JP) ........................................ 2000-329308

(51) Int. Cl.[7] .............................................. B23B 29/02
(52) U.S. Cl. ...................... 408/147; 408/224; 409/144; 409/230
(58) Field of Search ................................ 408/147, 186, 408/146, 224; 409/144, 215, 230, 201

(56) References Cited

U.S. PATENT DOCUMENTS

| | | | |
|---|---|---|---|
| 2,228,005 A | | 1/1941 | Giles |
| 2,575,116 A | | 11/1951 | Murray |
| 3,352,185 A | | 11/1967 | Wohlhaupter et al. |
| 3,757,637 A | * | 9/1973 | Eich et al. .................. 409/230 |
| 4,224,846 A | * | 9/1980 | Eysel et al. .................. 408/147 |
| 4,599,023 A | * | 7/1986 | Poincenot .................... 409/233 |
| 5,240,360 A | * | 8/1993 | Esser ......................... 409/230 |
| 5,632,075 A | | 5/1997 | De Bernardi et al. |
| 5,865,573 A | | 2/1999 | Kress |
| 6,241,436 B1 | * | 6/2001 | Sahm et al. ................. 409/144 |
| 6,270,295 B1 | * | 8/2001 | Hyatt et al. ................. 408/147 |

FOREIGN PATENT DOCUMENTS

| | | |
|---|---|---|
| GB | 577579 | 12/1943 |
| JP | 10-286735 | 10/1998 |

* cited by examiner

Primary Examiner—Daniel W. Howell
(74) Attorney, Agent, or Firm—Paul & Paul

(57) ABSTRACT

The invention provides an apparatus for positioning a cutter a tool relative to a spindle of a machine tool. The machine tool include a spindle having a rotating axis and a spindle housing for supporting the spindle for rotation about the rotating axis. The apparatus includes a shank which is adapted to be mounted to the spindle of the machine tool. A piston is provided in the shank for movement along an axis which defines an angle relative to the rotating axis of the spindle. A cutter, for machining a workpiece, is connected to the piston. A first fitting member is provided on the shank and a second fitting member is provided on the piston so as to be able to fit to the first fitting member. Each of the first and second fitting members include an abutment provided on the first and second fitting members to contact each other in the direction of the axis. A fitting recess is provided in one of the first and second fitting members and a fitting protrusion is provided on the one of the second and first fitting members for fitting into the fitting recess. The cutter is axially and circumferentially positioned relative to the axis of the movement of the piston by contacting the abutments each other and fitting the fitting protrusion into the fitting recess.

10 Claims, 5 Drawing Sheets

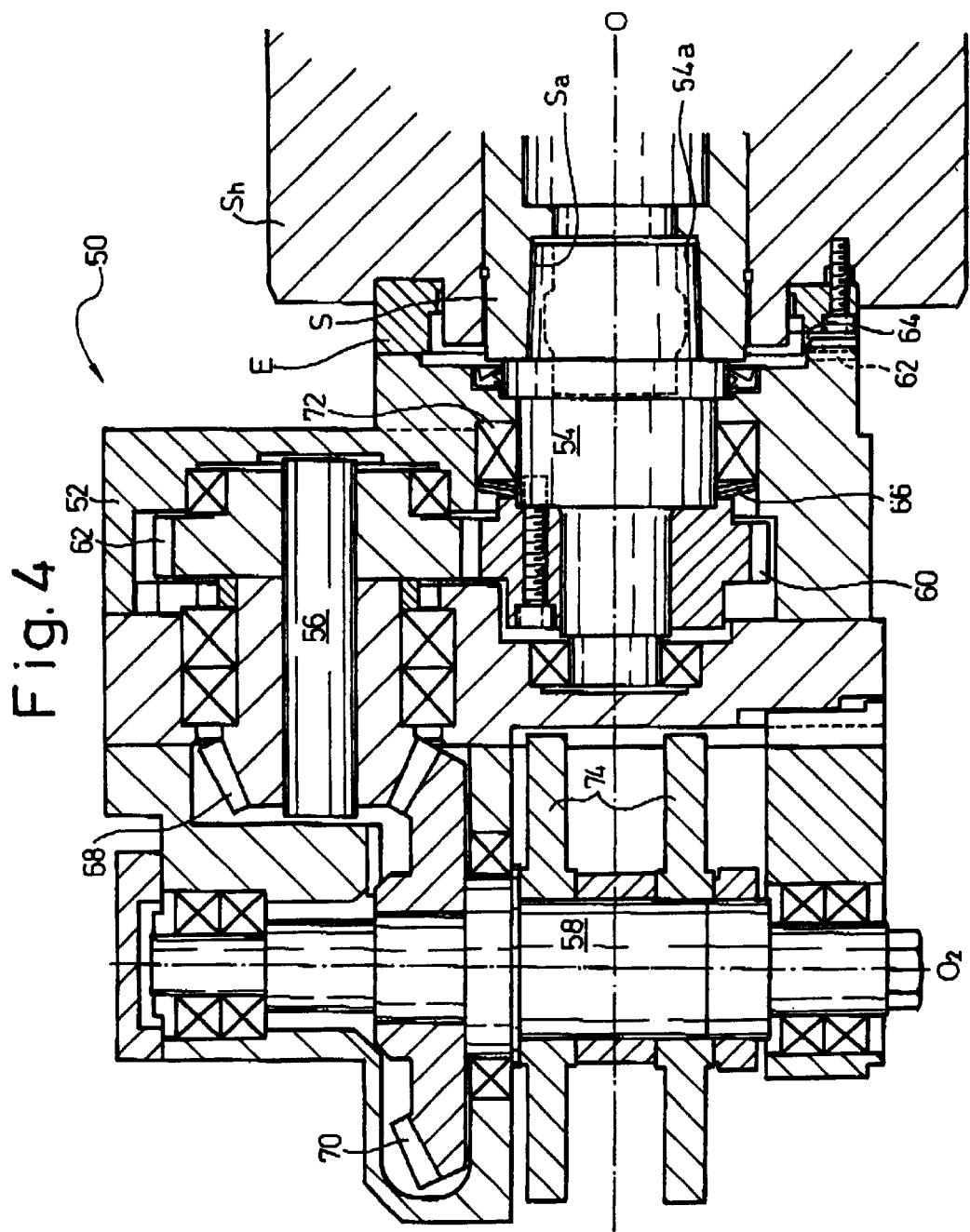

APPARATUS FOR POSITIONING A CUTTER OF A TOOL RELATIVE TO THE SPINDLE OF A MACHINE TOOL

BACKGROUND OF THE INVENTION

1. Field of the Invention

The invention relates to an apparatus for positioning a cutter of a tool, which is adapted to be mounted to a spindle or a spindle apparatus of a machine tool, relative to the spindle.

2. Description of the Related Art

In the field of tools, there is a tool, such as a boring boa, which has a cutter movable relative to the shank of the tool which is adapted be mounted to the and of the spindle of a machine tool. In such a tool, it is difficult to precisely position the cutter relatively to the spindle.

Further, there is a tool, which is generally referred to an attachment tool. For example, Japanese Unexamined Patent Publication (Kokai) No. 10-286735 (JPP '735) describes an attachment tool having an inclined shaft rotationally supported in a housing. The housing is adapted to be detachably secured to the spindle head of a machine tool with a tapered ring clamped therebetween. A position adjusting means is provided for adjusting and fixing the position of the tapered ring in the axial direction of the main spindle of the machine tool so that the tapered ring is resiliently deformed to increase its diameter. This absorbs looseness between the housing of the attachment tool and the spindle head.

The position adjusting means described in JPP '735 positions the tapered ring itself and does not position the cutter itself, in particular the tip of the cutter relative to the axis of the spindle of the machine tool. Although the attachment tool of JPP '735 reduces or removes the looseness between the attachment tool and the spindle head, it cannot position the cutter tip accurately relative to the spindle of the machine tool.

SUMMARY OF THE INVENTION

The invention is directed to solve the prior art problems, and to provide an improved apparatus for positioning the cutter tip of a tool relative to the spindle of a machine tool.

The objective of the invention is to provide an apparatus for positioning the cutter tip of a tool which includes a movable cutter.

The objective of the invention is to provide an apparatus for positioning the cutter tip of a tool which includes input and output shafts rotatably supported in a housing which is mounted to a housing of a spindle device of a machine too and a cutter mounted to the output shaft.

According to the invention, there is provided an apparatus for positioning a cutter of a tool relative to a spindle of a machine tool which includes a spindle having a rotating axis and a spindle housing for supporting the spindle for rotation about the rotating axis, the apparatus comprising:

a shank adapted to be mounted to the spindle of the machine tool;

a piston provided in the shank for movement along an axis which defines an angle relative to the rotating axis of the spindle;

a cutter, connected to the piston, for machining a workpiece;

a first fitting member provided on the shank;

a second fitting member provided on the piston so as to be able to fit to the first fitting member;

the first and second fitting members including abutments to contact each other in the direction of the axis, one of the first and second fitting members including a fitting recess, one of the second and first fitting members including a fitting protrusion for fitting into the fitting recess; and the cutter being axially and circumferentially positioned relative to the axis of the movement of the piston by contacting the abutments each other and fitting the fitting protrusion into the fitting recess.

According to another feature of the invention, there is provided an apparatus for positioning a cutter of a tool relative to a spindle of a machine tool which includes a spindle having a rotating axis and a spindle housing for supporting the spindle for rotation about the rotating axis, the apparatus comprising:

an input shaft adapted to be connected to the spindle of the machine tool;

an output shaft;

a gear train for transmitting the rotational power from the input shaft to the output shaft;

a tool housing for housing the input and output shafts and the gear train and for rotatably supporting the input and output shafts, the housing being adapted to be secured to the spindle housing of the machine tool;

a cutter mounted to the output shaft for rotating therewith;

a first fitting member fixed to the spindle housing;

a second fitting member provided on the tool housing so as to be able to fit to the first fitting member;

the first and second fitting members including abutments to contact each other in the direction of the axis, one of the first and second fitting members including a fitting recess, one of the second and first fitting members including a fitting protrusion for fitting into the fitting recess; and the tool housing being axially and circumferentially positioned relative to the rotating axis of the spindle by contacting the abutments each other and fitting the fitting protrusion into the fitting recess whereby the cutter is positioned relative to the spindle.

DESCRIPTION OF THE DRAWINGS

These and other objectives and advantages and further description will now be discussed in connection with the drawings in which:

FIG. 4 is a section of a second embodiment of the invention;

DESCRIPTION OF THE PREFERRED EMBODIMENTS

With reference to the drawings, preferred embodiments of the invention will be described.

Figure 1:
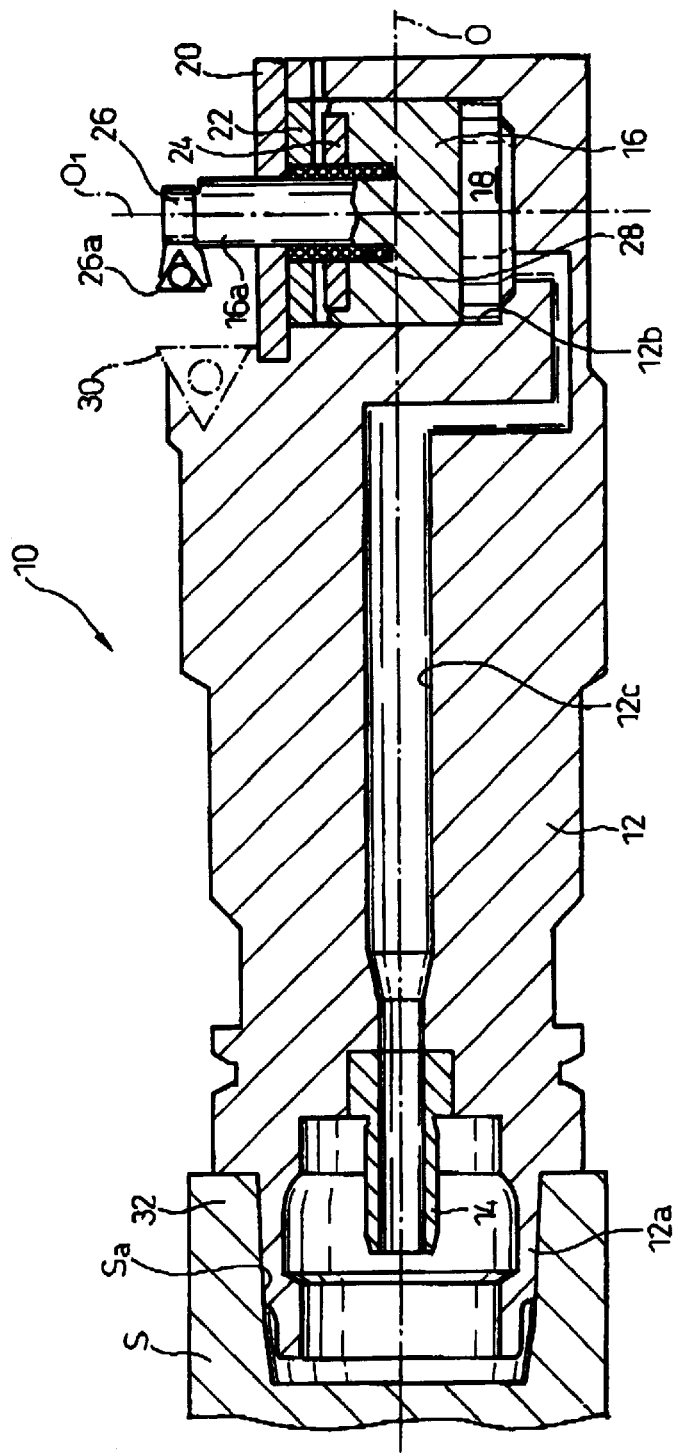
FIG. 1 is a section of a first embodiment of the invention.

Referring to FIG. 1, in the first embodiment of the invention, a tool 10 is a boring bar with a movable cutter. The tool 10 has a shank 12 provided with a hollow tapered portion 12a at the rear or proximal end thereof. The tapered portion 12a is adapted to be fitted into a tapered hole $S_a$ of a spindle S of a machining center (not shown). The shank 12 has a central axis O which is aligned with the rotational axis of the spindle S when the tool 10 is mounted to the spindle S. Within the tapered portion 12a, a coolant inlet portion 14 extends along the central axis O. The coolant inlet portion 14 is fitted into a coolant passage (not shown) provided through the spindle S, when the tool 10 is mounted to the spindle S, to receive a coolant from a coolant supply source (not shown) provided outside of the machining center through the coolant passage.

Adjacent to the distal end of the shank 12, a cylinder bore 12b is formed along an axis $O_1$ perpendicular to the central axis O. The opening of the cylinder bore 12b is closed by a closure 20. A piston 16 is provided in the cylinder bore 12b slidable in the direction of the axis $O_1$. A fluid chamber 18 is defined between the cylinder bore 12b and the piston 16. The fluid chamber 18 is fluidly connected to the coolant inlet portion 14 through a coolant supply passage 12c provided in the shank 12. A rough-machining cutter 30 is detachably secured to the exterior side surface of the shank 12.

The piston 16 has an arm portion 16a extending along the axis $O_1$ to the outside through a central opening provided in the closure 20. At the end of the arm portion 16a, a finishing cutter 26a is detachably secured by a cutter block 26. The piston 16 is axially inwardly biased to the direction away from the closure 20 by a spring 28 provided around the arm portion 16a. Positioning means 22 and 24 composed of male and female members is provided between the closure 20 and the piston 16. In particular, the male member 22 is connected to the closure 20 and the female member 24 is connected to the piston 16.

Figure 2A:
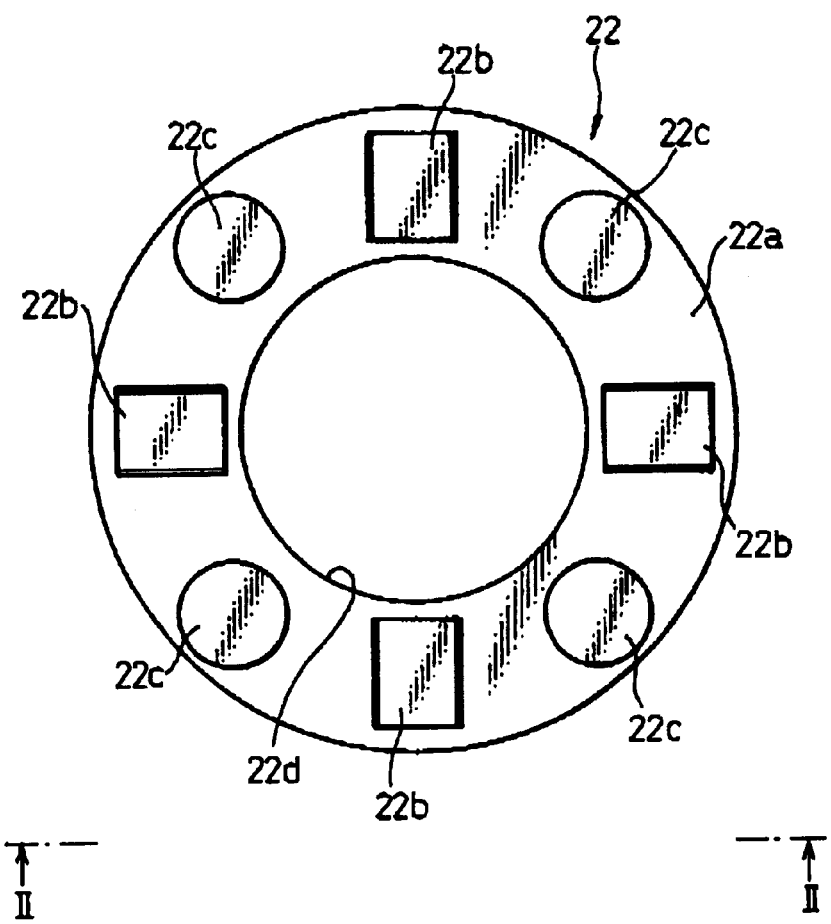
FIG. 2A is a plan view of a male member of positioning means according to the first embodiment.
Figure 2B:
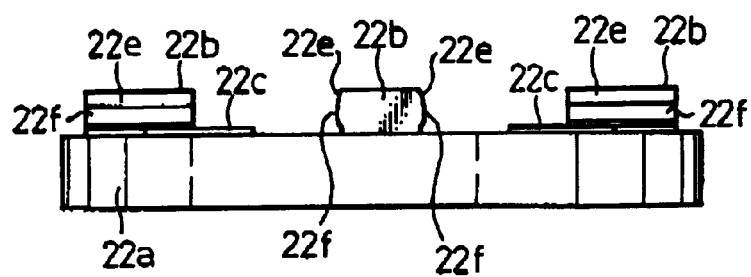
FIG. 2B is a side view of the male looking in the direction of arrows II—II in FIG. 2A.

Referring to FIG. 2, the male member 22 of the positioning means has an annular base member 22a including a central opening 22d for the passage of the arm portion 16a, a plurality of fitting protrusions 22b and abutments 22c defined on the base member 22a. In FIG. 2, the fitting protrusions 22b and the abutments 22c are formed to axially extend (in the direction of the axis $O_1$ when assembled) from one end face, in particular axially inner end face when assembled, of the base member 22a and are circumferentially and alternatively disposed at an angle. In particular, the fitting protrusions 22b are formed into substantially a rectangular solid shape having tapered side surfaces 22e which approach each other toward the distal end of the fitting protrusion, as shown in FIG. 2B, and a pair of parallel fitting surfaces 22f provided on the opposite sides of the fitting protrusions 22b. The end faces of the abutments 22c are disposed in a plane perpendicular to the axis of the base member 22a.

Figure 3A:
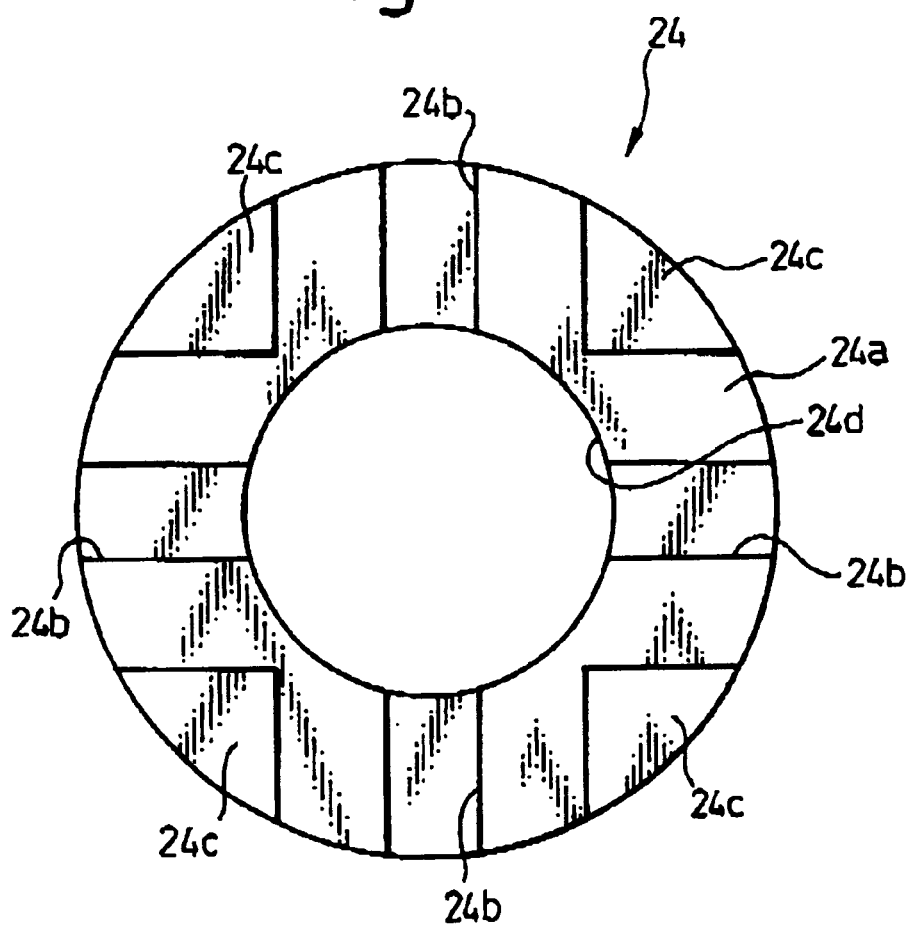
FIG. 3A is a plan view of a female member of the positioning means.
Figure 3B:
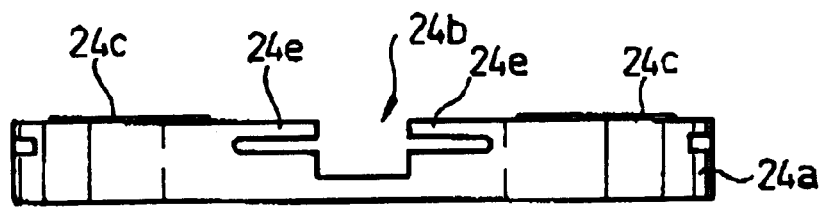
FIG. 3B is a side view of the female member looking in the direction of arrows III—III in FIG. 3A.

Referring to FIG. 3, the female member 24 of the positioning means comprises an annular base member 24a including a central opening 24d for the passage of the arm portion 16a and fitting recesses 24b and abutments 24c. The fitting recesses 24b and the abutments 24c are circumferentially and alternatively disposed at an angle. In FIG. 3, the fitting recesses 24b axially retreat (in the direction of the axis $O_1$ when assembled) from one end face, in particular the axially outer end face when assembled, of the base member 24a to receive the fitting protrusions 22b of the male member 22. A pair of fitting arms 24e are provided in each of the fitting recesses 24b, in particular on the periphery of the opening of the recess, so that the each pair of the fitting arms 24e fit on the fitting surfaces 22b of each of the fitting protrusions 22b. The fitting arms 24e extend in the plane of the end face of the base member 24a where the fitting recesses 24b are formed. Each of the abutments 24c is a protrusion in the form of a quadrant extending from the end face of the base member 24a. The end faces of the abutments 24c are disposed in a plane perpendicular to the axis of the base member 24a.

The operational function of the first embodiment will be described bellow.

In this embodiment, the tool 10 is a boring bar which is used in a machining center and coaxially disposed relative to a bore (not shown) precedently provide in a workpiece (not shown). A boring process is carried out on the inner surface of the precedently provided bore with the rough-machining cutter 30 by advancing the tool 10 in the direction of the central axis O with the spindle S of the machining center rotating. During this rough machining process, the piston 16 is retracted by decreasing the pressure within the fluid chamber 18.

When the boring process carried out by the rough-machining cutter 30 is completed, pressurized coolant is supplied to the fluid chamber 18 from the coolant source through the coolant passage and the coolant supply passage 12c. This forces the piston 16 outwardly along the axis $O_1$. The female member 24 of the positioning means is outwardly pressed by the piston 16 along the axis $O_1$ toward the male member 22 so that the male member 22 and the female member 24 finally fit to each other. In particular, the fitting protrusions 22b of the male member 22 move into the fitting recesses 24b of the female member 24, with the fitting arms 24e bent, until the abutments 22c and 24c of the male and female members 22 and 24 contact each other so that the distal ends of the fitting arms 24e and the fitting surfaces 24f of the fitting protrusions 22b snugly fit to each other. The tapered portions 22e of the fitting protrusions 22b allow the fitting protrusions 22b to be smoothly centered between the fitting arms 24e when the fitting protrusions 22b move into the respective fitting recesses 24b so that the fitting protrusions 22b is clamped by the ends of the fitting arms 24e. The male member 22 and the female member 24 are axially positioned relative to each other by contacting the abutments 22c and 24c of the male and the female members 22 and 24 with each other, and circumferentially positioned by the fitting arms 24e clamping the fitting protrusions 22b.

Thus, fitting the male and female members of the positioning means 22 and 24 to each other positions the arm portion 16a of the piston 16 axially and radially relative to the axis $O_1$ so that the finishing cutter 26a mounted to the distal end of the arm portion 16a is precisely positioned relative to the central axis O. Therefore, the finishing cutter 26a is precisely positioned to the spindle S of the machine tool.

Once the finishing cutter 26a is positioned by advancing the piston 16, the inner surface of the bore in the workpiece, which inner surface has been machined by the rough-machining cutter 30, is finished with the finishing cutter 26a by moving the tool 10 rewardly with the spindle S rotating.

In the above-described embodiment, the invention is described regarding to a boring bar with a cutter movable along the axis different from the rotational axis of the spindle. However, it may be conceived by those skilled in the art that the invention can be applied to a boring bar which includes a cutter movable along the rotational axis of the spindle S.

Figure 5A:
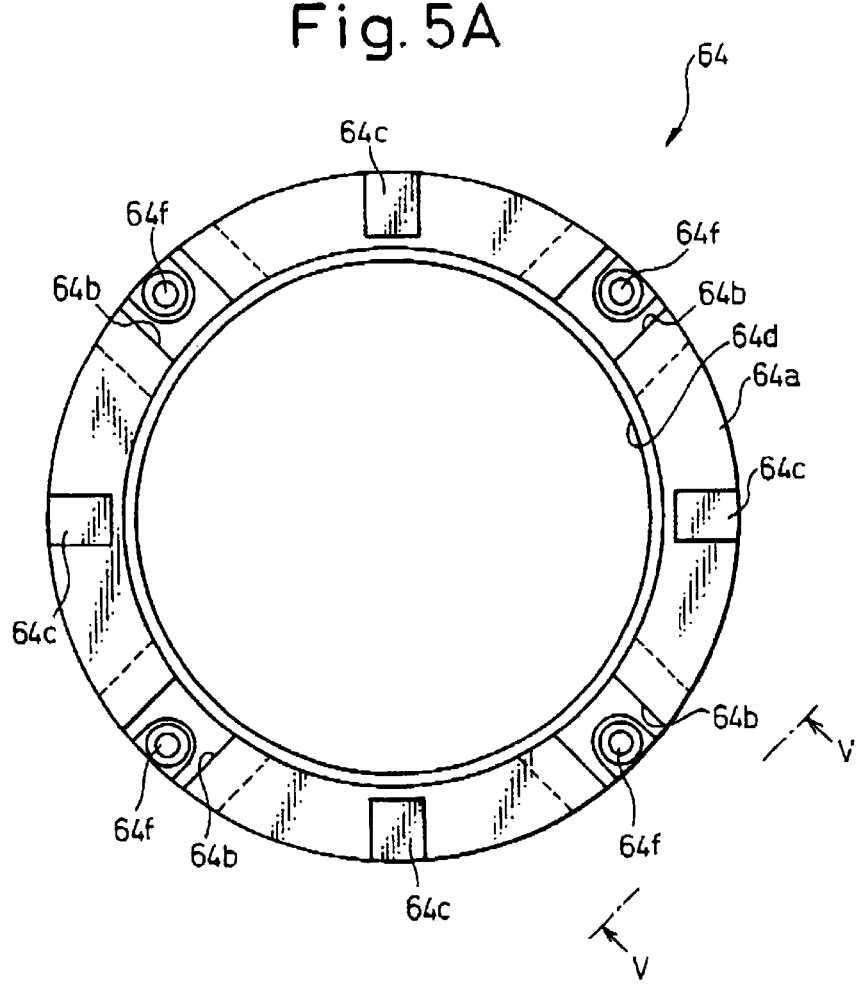
FIG. 5A is a plan view of a female member of the positioning means according to the embodiment shown in FIGS. 2A and 2B.
Figure 5B:
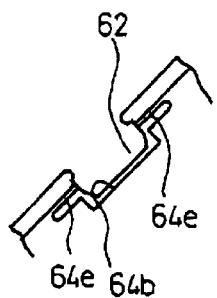
FIG. 5B is a partial side view of the female member looking in the direction of arrows V—V in FIG. 5A.

With reference to FIGS. 4, 5A and 5B, a second embodiment of the invention will be described.

In the embodiment shown in FIG. 4, a tool 50 is so-called a attachment tool or a spindle attachment which is adapted to be mounted to the end of a spindle apparatus of a machining center. The spindle apparatus includes a spindle S which is rotationally supported by a housing $S_h$ (hereinafter, the spindle housing $S_h$) of the spindle apparatus. The spindle S includes a tapered hole $S_a$ for receiving an input shaft 54 of the tool 50 at the end of the spindle S. An end plate E is mounted to the spindle housing $S_h$ around the end portion of the spindle S. A female member 64 of positioning means, similar to the female member 24 of the first embodiment, is integrally connected to the end plate E. In FIG. 4, fitting protrusion 64 is shown as a portion of the male member.

Referring to FIGS. 5A and 5B, the female member 64 has an annular base member 64a, integrally connected to the end plate E, which female member includes a central opening 64d for the passage of the spindle S, a plurality of fitting recess 64b and abutments 64c which are circumferentially alternatively disposed on one end face, in particular axially outer end face when assembled, of the base member 64a. In FIGS. 5A and 5B3, the fitting recesses 64b axially retreat (in the direction of the central axis O) from the one end face of the base member 64a to receive fitting protrusions 62 of the male member connected to the spindle housing. A pair of fitting arms 64e are provided on the periphery of the opening of each of the fitting recesses 64b, as in the first embodiment, so that the each pair of the fitting arms 64e fit on the fitting surfaces (not shown) of each of the fitting protrusions 62, The fitting arms 64e extend substantially in the plane of the end face of the base member 64a where the fitting recesses 64b are formed. Each of the abutments 64c is a protrusion in the form of a substantially a rectangular solid shape having end faces disposed in a plane perpendicular to the axis of the base member 64a.

The tool 50 includes an input shaft 54 having a central axis O which is aligned with the rotational axis of the spindle S when the tool 50 is mounted to the spindle S. The tool 50 further includes an intermediate shaft 56 parallel to the input shaft 54 and an output shaft 58 extending along an axis $O_2$ perpendicular to the central axis O. The shafts 54, 56 and 58 are rotationally supported in a tool housing 52. A tapered portion 54a, which is adapted to be fitted into the tapered hole $S_a$ of the spindle S, is provided at the rear end of the input shaft 54. When the tool 50 is mounted to the spindle S, the tapered portion 54a is drawn in the reward direction of the spindle S by a tool drawing device (not shown), provided in the spindle S, so that the tool 50 is securely mounted to the distal end of the spindle S.

A gear wheel 60 is mounted to the input shaft 54 to rotate with the input shaft 54. A gear wheel 63, which engages the gear wheel 60 of the input shaft 54, and a helical gear wheel 68 are is mounted to the intermediate shaft 56 to rotate therewith. A helical gear wheel 70, which engages the helical gear wheel 68 of the intermediate shaft 56, is mounted to the output shaft 58 to rotate therewith. Further, a pair of parallel cutters 74, which are oriented perpendicular to the axis $O_2$, are mounted to the end of the output shaft 58.

Provided between the tool housing 52 of the tool 50 and the spindle housing $S_h$ is the positioning means which includes male and female members, which provide first and second fitting members, similar to the positioning means described with referring to FIGS. 2 and 3. The female member 64 shown in FIGS. 5A and 5B is connected to the end plate E of the spindle housing $S_h$. A male member, similar to the male member 22 shown in FIG. 2, includes an annular base member which is integrally connected to the tool housing 52 and includes a central opening for the passage of the input shaft. A plurality of fitting protrusion 62, which is adapted to fit into the fitting recess 64b, and abutments (not shown), which adapted to contact abutments 64c of the female member 64 in direction of the central axis O, are provided on the axially outer end face of the annular base member connected to the tool housing 52 which contacts the end plate E of spindle housing $S_h$.

The operational function of the second embodiment will be described below.

The tool 50 is mounted to the end of the spindle S with the tapered portion 54a of the input shaft 54 fitting into the tapered hole $S_a$ of the spindle S. Once the tool 50 is mounted to the spindle S, the rotation of spindle S rotationally drives the input shaft 54. The rotational power of the spindle S is transmitted to the output shaft 58 from the input shaft 54 through the gear train of the gear wheel 60 of the input shaft 54, the gear wheel 63 of the intermediate shaft 56 and the helical gear wheels 68 and 70. At the mounting of the tool 50 to the spindle S, when the input shaft 54 is drawn in the reward direction of the spindle S, a Belleville spring 66, provided between a bearing 72 and the gear wheel 60 of the input shaft 54, resiliently biases the tool housing 52 to the spindle housing $S_h$ so that the fitting protrusion 62 of the male member is fitted into the fitting recess 64b of the female member 64 and the abutment of the male member contacts the abutments 64c of the female member 64. Appropriately selecting the spring coefficient of the Belleville spring 66 relative to the amount of the draw of the input shaft 54 allows to determine the pressure between the abutment of the male member and the abutments 64c of the female member 64.

Thus, fitting the male member and the female member of the positioning means 64 to each other positions the tool housing 52 of the tool 50 axially and radially relative to the central axis O whereby the cutters 74 are precisely positioned.

It will also be understood by those skilled in the art that the forgoing description is a preferred embodiment of the disclosed device and that various changes and modifications may be made without departing from the spirit and scope of the invention.

We claim:

1. An apparatus for positioning a cutter of a tool relative to a spindle of a machine tool which includes a spindle having a rotating axis and a spindle housing for supporting the spindle for rotation about the rotating axis, the apparatus comprising:

a shank adapted to be mounted to the spindle of the machine tool;

a piston provided in the shank for movement along an axis which defines an angle relative to the rotating axis of the spindle;

a cutter, connected to the piston, for machining a workpiece;

a first fitting member provided on the shank;

a second fitting member provided on the piston so as to be able to fit to the first fitting member;

the first and second fitting members including abutments to contact each other in the direction of the axis, one of the first and second fitting members including a fitting recess, one of the second and first fitting members including a fitting protrusion for fitting into the fitting recess; and the cutter being axially and circumferentially positioned relative to the axis of the movement of the piston by contacting the abutments to each other and fitting the fitting protrusion into the fitting recess.

2. An apparatus according to claim 1, further comprising a pair of fitting arms provided on the periphery of the opening of the fitting recess; and the fitting protrusion including fitting surfaces, the ends of the fitting arms fitting on the fitting surfaces of the fitting protrusion when the fitting recess receives the protrusion.

3. An apparatus according to claim 1, wherein the abutments have end surfaces perpendicular to the axis of the movement of the piston.

4. An apparatus according to claim 1, wherein the shank includes a cylinder bore for slidably receiving the piston;

the piston having an arm portion extending along the axis of the movement of the piston;

the first fitting member including an annular base member which is connected to the shank adjacent the opening of the cylinder bore and includes a central opening for the passage of the arm portion of the piston, the abutment extending from the inner end face of the annular base member and the fitting protrusion extending from the inner end face of the annular base member; and the second fitting member including an annular base member which is connected to the piston and a central opening for the passage of the arm portion of the piston, the abutment extending from the outer end face of the annular base member, the outer end face being opposed to the inner end face of the annular base member of the first fitting member and the fitting recess axially retreating from the outer end face.

5. An apparatus according to claim 1, wherein the tool is a boring bar.

6. An apparatus according to claim 1, where in the cutter is detachably secured to the piston.

7. An apparatus for positioning a cutter of a tool relative to a spindle of a machine tool which includes a spindle having a rotating axis and a spindle housing for supporting the spindle for rotation about the rotating axis, the apparatus comprising;

an input shaft adapted to be connected to the spindle of the machine tool;

an output shaft;

a gear train for transmitting the rotational power from the input shaft to the output shaft;

a tool housing for housing the input and output shafts and the gear train and for rotatably supporting the input and output shafts, the housing being adapted to be secured to the spindle housing of the machine tool;

a cutter mounted to the output shaft for rotating therewith;

a first fitting member fixed to the spindle housing;

a second fitting member provided on the tool housing so as to be able to fit to the first fitting member;

the first and second fitting members including abutments to contact each other in the direction of the axis, one of the first and second fitting members including a fitting recess, one of the second and first fitting members including a fitting protrusion for fitting into the fitting recess; and the tool housing being axially and circumferentially positioned relative to the rotating axis of the spindle by contacting the abutments to each other and fitting the fitting protrusion into the fitting recess whereby the cutter is positioned relative to the spindle.

8. An apparatus according to claim 7, further comprising a pair of fitting arms provided on the periphery of the opening of the fitting recess; and the fitting protrusion including fitting surfaces, the ends of the fitting arms fitting on the fitting surfaces of the fitting protrusion when the fitting recess receives the protrusion.

9. An apparatus according to claim 7, wherein the abutments have end surfaces perpendicular to the axis of rotation of the spindle.

10. An apparatus according to claim 7, wherein the first fitting member includes an annular base member which is connected to the spindle housing and includes a central opening for the passage of the spindle of the machine tool, the abutment extending from the outer end face of the annular base member and the fitting protrusion extending from the outer end face of the annular base member; and the second fitting member including an annular base member which is connected to the tool housing and a central opening for the passage of the input shaft, the abutment extending from the outer end face of the annular base member, the outer end face being opposed to the inner end face of the annular base member of the first fitting member and the fitting recess axially retreating from the outer end face.

* * * * *